United States Patent [19]

Hollinger

[11] Patent Number: 4,603,757
[45] Date of Patent: Aug. 5, 1986

[54] TREE STAND

[76] Inventor: Brian L. Hollinger, 5316 S. 93rd St., Ralston, Nebr. 68127

[21] Appl. No.: 676,167

[22] Filed: Nov. 29, 1984

[51] Int. Cl.$^4$ ............................................. E04G 3/100
[52] U.S. Cl. ................... 182/187; 182/188; 108/152
[58] Field of Search ............... 182/187, 188; 108/152

[56] References Cited

U.S. PATENT DOCUMENTS

| | | | |
|---|---|---|---|
| 3,065,821 | 11/1962 | Hundley, Jr. | 182/187 |
| 3,078,951 | 2/1963 | Schneebeli et al. | 182/134 |
| 3,460,649 | 8/1969 | Baker et al. | 182/187 |
| 3,493,080 | 2/1970 | Ehlert et al. | 182/187 |
| 3,513,940 | 5/1970 | Ussery | 182/187 |
| 3,817,350 | 6/1974 | Gray | 182/187 |
| 3,871,482 | 3/1975 | Southard | 182/187 |
| 4,120,379 | 10/1978 | Carter | 182/187 |
| 4,148,376 | 4/1979 | Campbell, Jr. | 182/20 |
| 4,236,602 | 12/1980 | Leggett | 182/187 |
| 4,411,335 | 10/1983 | Forrester | 182/83 |
| 4,474,265 | 10/1984 | Shinkle | 182/187 |
| 4,475,627 | 10/1984 | Eastridge | 182/187 |

Primary Examiner—Ramon S. Britts
Assistant Examiner—Karen J. Chotkowski
Attorney, Agent, or Firm—Henderson & Sturm

[57] ABSTRACT

A tree stand having a frame adapted to be disposed substantially vertically along the tree trunk. A pair of spaced apart tree engaging members are attached to a top portion of the frame and having a seat connected thereto. A second pair of tree engaging members are pivotally attached along the substantially horizontal axis to a lower portion of the frame for engaging the tree trunk at a second vertical level. A fastening mechanism is provided for extending around the tree trunk and around the frame, for attaching the tree stand to the tree trunk at a desired level. A platform is rigidly attached to the second tree engaging members for permitting the person to stand on the platform when it is in a horizontal disposition. The platform and second tree engaging members are rigidly attached together and are pivotally attached to the frame for permitting the second tree engaging members to be movable between a first position substantially below the horizontal axis and a second at substantially the same level as the horizontal axis, whereby movement of the platform from an elevated position to a horizontal position will cause a lower portion of the frame to be pushed outwardly away from the tree trunk, thereby tightening the fastening means to an extremely tight position. A stop mechanism is provided for preventing the platform from pivoting downwardly beyond a substantially horizontal position.

9 Claims, 9 Drawing Figures

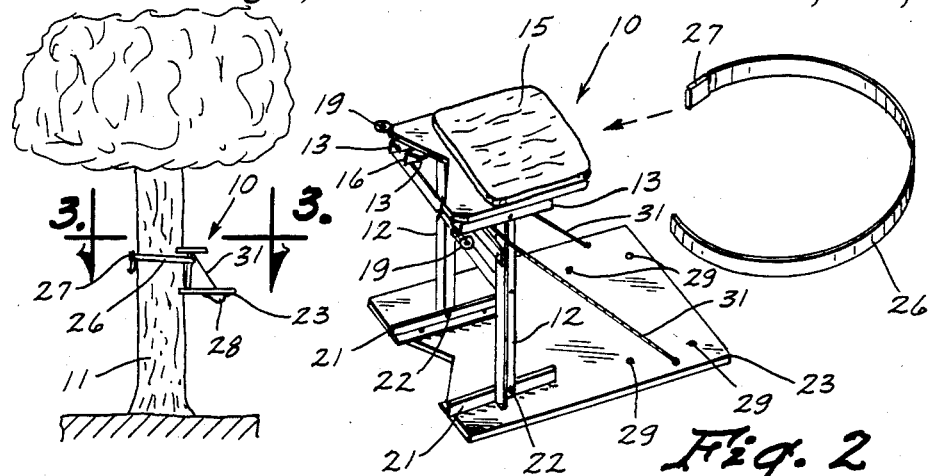
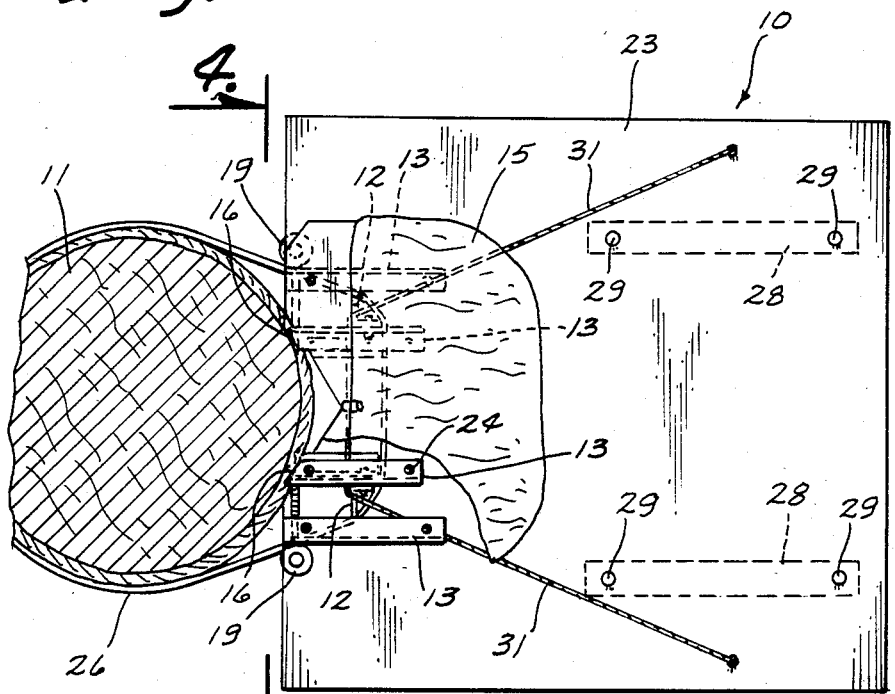

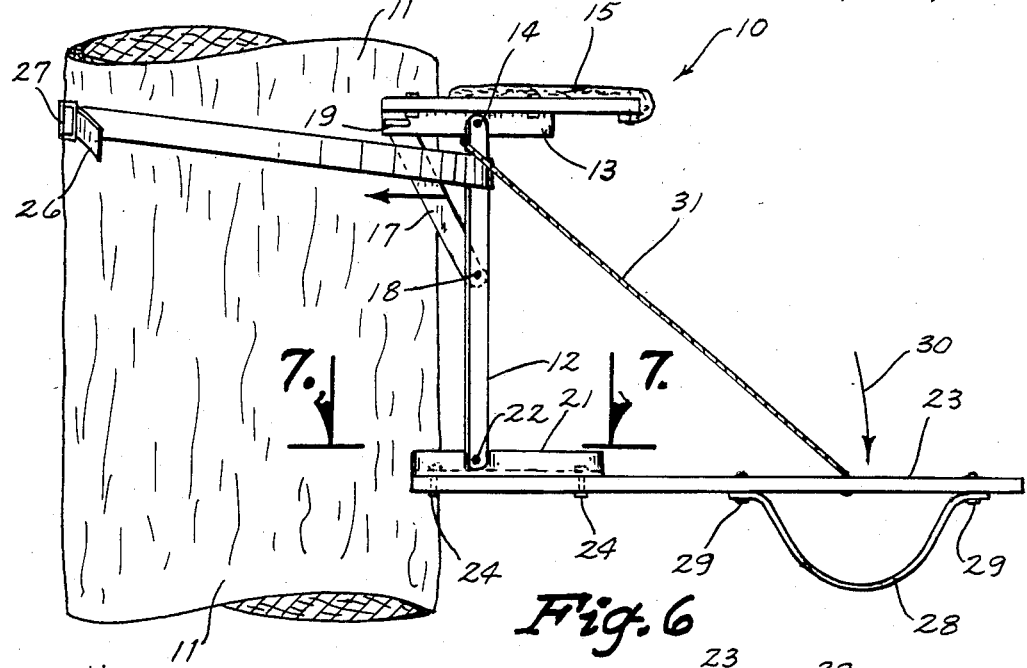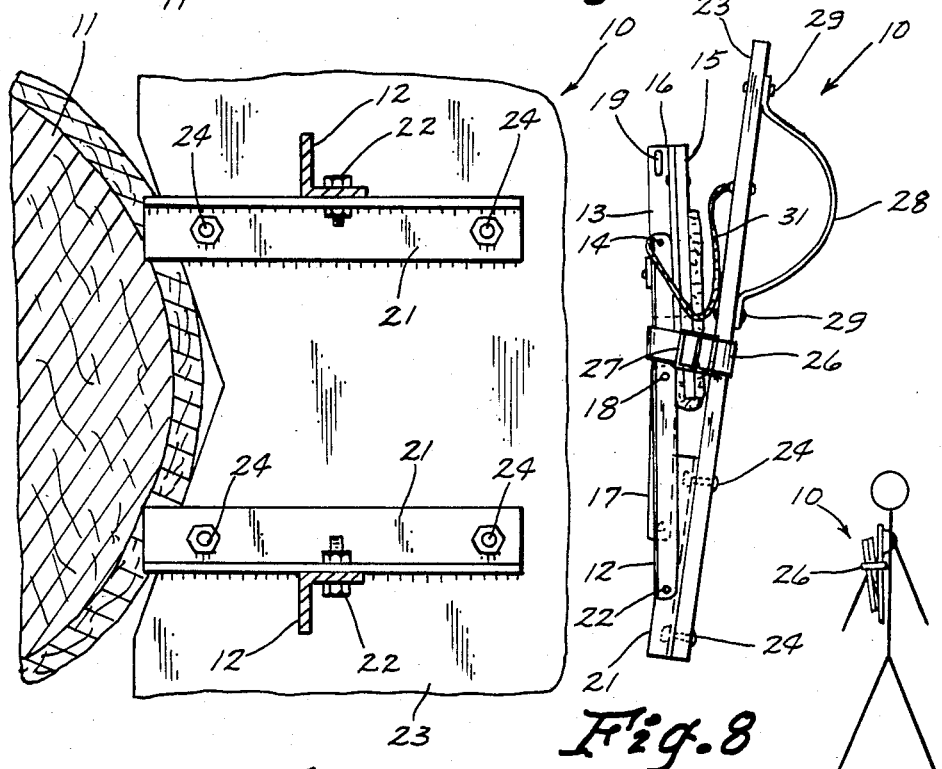

TREE STAND

TECHNICAL FIELD

The present invention relates generally to tree stands for hunting, and more particularly to a portable tree stand having a mechanism thereon for facilitating easy tightening of the tree stand onto the trunk of a tree.

BACKGROUND ART

Tree stands have been used for decades for hunting deer. One reason for their widespread use is that a hunter can see farther and better from such an elevated position. Also, a hunter is less likely to be seen by deer from an elevated position because deer have few, if any, natural enemies that attack from trees in most areas in the United States, for example. Furthermore, in an elevated position, a deer or other animal is less likely to catch a human scent traveling through the air.

The earliest of the tree stands were permanent structures nailed to trees, including a platform, steps leading to such platform, and perhaps even a separate seat built onto the tree trunk or in the fork of a tree.

One of the problems with permanent stands is that they damage the tree. Furthermore, many landowners object to having such a structure built in their trees. Another problem with permanent stands is that deer change their patterns from time to time so that a hunter, desiring to change hunting positions, must build another permanent stand, because they are not easily movable from one tree to another.

Because of the aforementioned problems with permanent tree stands, and for other reasons, portable tree stands have been developed. These portable tree stands are transportable from place to place and most are constructed to minimize any damage to the tree itself. Some such tree stands can be manipulated by the hunter himself to move step by step up a tree, such as in U.S. Pat. No. 3,460,649 to Baker et al. Advantages of such a tree stand include the fact that no ladder is necessary, but disadvantages of such a stand are that it is somewhat noisy in moving up or down a tree, and only certain trees can be climbed with using such a stand. For example, trees with branches on the lower part of the trunk prevent the stand from moving past such branches. Such stands can also be unstable if a hunter stands on a portion thereof too close to the tree, or noisy if a hunter shifts his weight too much.

Other tree stands have been developed which have been secured to a tree by straps, such as shown in U.S. Pat. No. 3,065,821 to Hundley, chains such as U.S. Pat. Nos. 3,871,482 to Southard and 4,411,335 to Forrester, and ropes such as shown in U.S. Pat. No. 4,120,379 to Carter. These tree stands which are fastened to a tree trunk by straps, chains, or ropes tend to be more stable than the aforementioned climbing type, but they are difficult to install and extremely difficult to secure in a tight manner. If these stands are not secured tightly, they will tend to make noises of various types when a hunter shifts his weight. If such noises are made when a deer or other animal being hunted is close by, such animal is likely to detect the hunter's position and quickly move out of gun, bow or camera range.

Consequently there is a need for a portable tree stand which can easily, quickly and securely be attached to a tree trunk so that it will be safe and quiet.

DISCLOSURE OF THE INVENTION

The present invention relates to a tree stand having a frame adapted to be disposed substantially vertically along the tree trunk. A pair of spaced apart tree engaging members are attached to a top portion of the frame and have a seat connected thereto. A second pair of tree engaging members are pivotally attached along the substantially horizontal axis to a lower portion of the frame for engaging the tree trunk of a second vertical level. A fastening mechanism is provided for extending around the tree trunk and around the frame, for attaching the tree stand to the tree trunk at a desired level. A platform is rigidly attached to the second tree engaging members for permitting the person to stand on the platform when it is in a horizontal disposition. The platform and second tree engaging members are rigidly attached together and are pivotally attached to the frame for permitting the second tree engaging members to be movable between a first position substantially below the horizontal axis and a second at substantially the same level as the horizontal axis, whereby movement of the platform from an elevated position to a horizontal position will cause the frame to be pushed outwardly away from the tree trunk, thereby tightening the fastening means to an extremely tight position. A stop mechanism is provided for preventing the platform from pivoting downwardly beyond a substantially horizontal position.

An object of the present invention is to provide an improved tree stand for hunting.

Another object of the present invention is to provide an improved portable tree stand having a mechanism thereon for easily and quickly causing the stand to be tightened so that it will be safe and quiet.

Another object of the present invention is to provide a tree stand of the aforementioned type which has a seat thereon and which tree stand can readily be folded for transporting it from place to place.

Other objects, advantages and novel features of the present invention will become apparent in the following detailed description of the invention when considered in conjunction with the accompanying drawings.

BRIEF DESCRIPTION OF THE DRAWINGS

FIG. 1 shows a view of the present invention shown installed on a tree;

FIG. 2 is a perspective view of the present invention in a position which it would be in when attached to a tree;

FIG. 3 is a top view taken along line 3—3 of FIG. 1, showing the tree stand attached to a tree trunk;

FIG. 6 shows the final stage of tightening of the tree stand from the FIG. 5 position, and shows the tree stand in a position to be used;

FIG. 7 is a partial enlarged cross sectional view taken along line 7—7 of FIG. 6;

FIG. 8 is a side elevational view of the tree stand of the present invention shown in a folded position ready to be transported from place to place; and FIG. 9 is a schematic view showing the tree stand of the present invention on the back of a person in a manner similar to the way that a backpack would be carried from place to place.

BEST MODE FOR CARRYING OUT THE INVENTION

Figure 4:
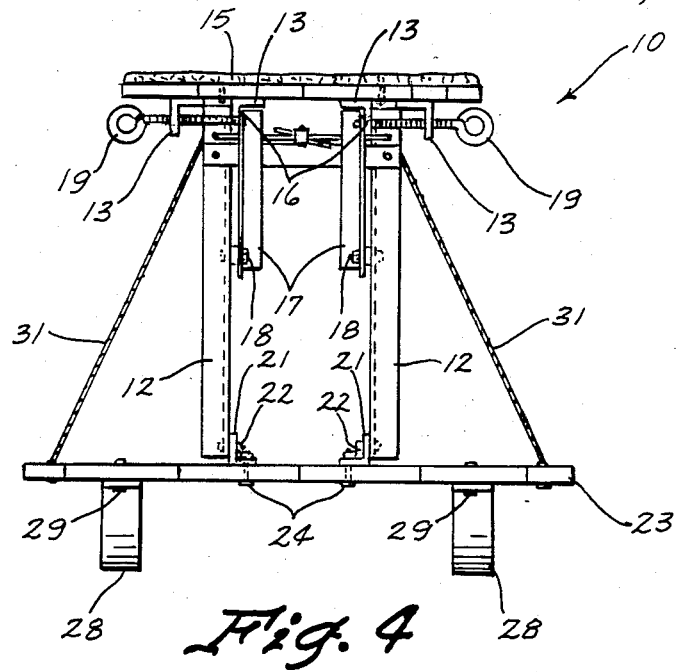
FIG. 4 is a cross sectional view taken along line 4—4 of FIG. 3.

Referring now to the drawings wherein like reference numerals designate identical corresponding parts throughout the several views, FIG. 1 shows a tree stand (10) constructed in accordance with the present invention attached to a tree trunk (11). The tree stand (10) includes a frame having a pair of aluminum angled members (12).

Figure 5:
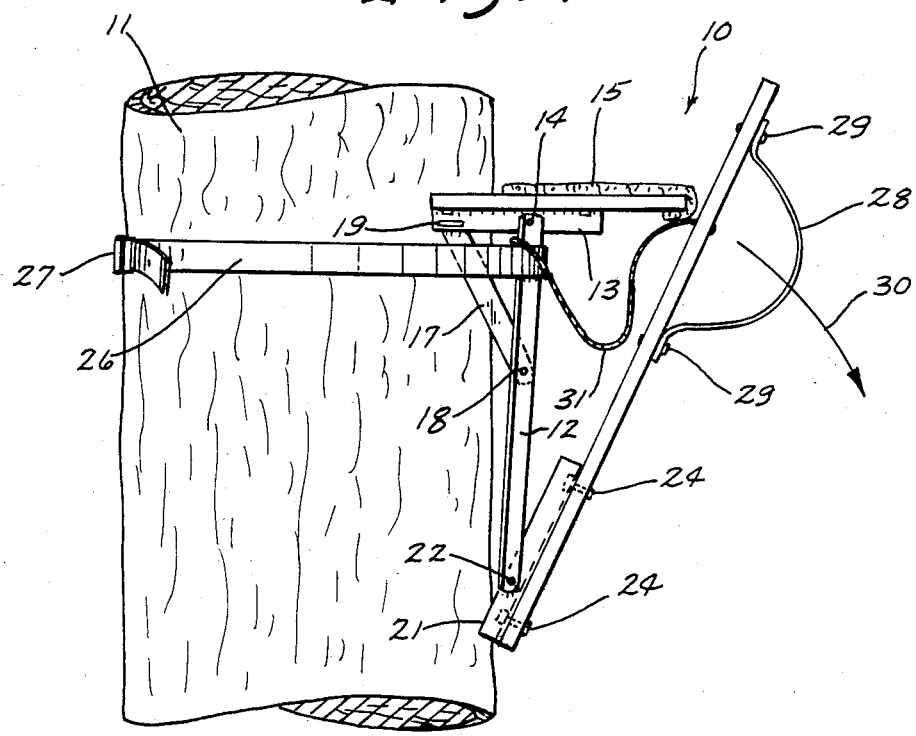
FIG. 5 is a side elevational view showing the tree stand of the present invention strapped to a tree and in the preliminary stages of being tightened.

Another pair of angle members (13) are pivotally attached to the top of the elongated frame members (12) by a pin structure (14). The angle members (13) have a seat structure (15) permanently secured to the top and one end thereof. The angle members (13) include tree engaging projections (16). The members (13) are pivotable from the folded position shown in FIG. 8 to the position for use as shown in FIG. 5.

A brace (17) is pivotally attached to each of the frames (12) by a pin (18) on the bottom thereof and can be attached at the top thereof to the end (16) of members (13) by threaded fasteners (19), which are threadably engageable through threaded openings in members (13) and (17).

A pair of elongated aluminum angle members (21) are pivotally attached to the bottom of the frame members (12) by a pin structure (22) and a wooden platform (23) is rigidly secured to each of the aluminum angle members (21) by nut and bolt fasteners (24). A strap (26) having a buckle arrangement (27) attached thereto is provided for securing the frame (12) to the trunk (11) of the tree and a pair of straps (28) are permanently attached to the bottom of the platform (23) by use of fasteners (29).

In operation, a person wishing to utilize the present invention would first have such tree stand (10) folded to the position shown in FIG. 8 and would then place the tree stand (10) on his back by placing his arms through the straps (28) in the same manner that one would put a conventional backpack on. The person would then transport the tree stand (10) to where it is to be used.

Once the tree stand (10) is adjacent to the chosen tree (11), for example as shown in FIG. 1, then the members (13) and seat (15) would be pivoted from the position shown in FIG. 8 to the position shown in FIGS. 2-6, and the fasteners (19) would be used to secure the brace (17) in the position shown in FIGS. 1-6 so that the members (13) and seat (15) will not pivot about the fasteners (14).

With the platform (23) in the position shown in FIG. 5, the tree stand is positioned at the desired level on the tree trunk (11) and strap (26) is placed around the frame (12) and around the tree trunk (11) and is pulled down and fastened as tightly as can be done in a manual fashion. Then the upper and outward to the right top edge of the platform (23) is manually grasped as shown in FIG. 5 and pulled downwardly in the direction of the arrow (30) in FIG. 5 to the horizontal position shown in FIG. 6. The platform (23) will not move downwardly beyond such horizontal position of FIG. 6 because of the presence of stop cables (31).

In the process of pivoting the platform (23) from the position shown in FIG. 5 to the position shown in FIG. 6, the frame (12) will be cammed or forced outwardly away from the tree trunk (11) and this will tighten the strap (26) much more tightly than such strap could ever be tightened by manual use of the buckle (27). Pivoting the platform downwardly also causes the second tree engaging member (21) to dig into the tree and force or pull the stand downwardly on the tree a little, thus aiding in the tightening process. With the tree stand (10) in the position shown in FIG. 6, it is then extremely tightly attached to the tree trunk (11) and can be used from that point on in a conventional fashion, with no fear that it will become loose or make creaking noises that would scare the game being hunted. If for any reason the strap (26) becomes loose, for example by stretching, the platform (23) can be moved to the FIG. 5 position, the strap (26) tightened, and the platform (23) pivoted to the FIG. 6 position to further tighten the strap (26).

Obviously, many modifications and variations of the present invention are possible in light of the above teachings. For example, the aluminum members shown in the preferred embodiment can be made of other materials and in other configurations without parting from the true scope of this invention. Similarly, the seat (15), and strap (26) and the platform (23) may be made of various materials and in various configurations. It is therefore to be understood that, within the scope of the appended claims, the invention may be practised otherwise than as specifically described.

I claim:
1. A tree stand comprising:
   a first three trunk engaging means for engaging a tree trunk at a first vertical level;
   a frame operatively pivotally attached along a first substantially horizontal axis at the top thereof to said first tree trunk engaging means and being substantially vertically disposed along a tree trunk and spaced from said tree trunk;
   a second tree engaging means for engaging said tree trunk at a second vertical level, said second vertical level being below said first vertical level;
   fastening means extending around a tree trunk for attaching an upper portion of said frame to the tree trunk;
   platform means rigidly attached to said second tree engaging means for permitting a person to stand on said platform when it is disposed in a horizontal disposition, said platform having an inner end adjacent to said second tree engaging means and an extreme outer end;
   pivot means for pivotally attaching said second tree engaging means and thereby said platform means to a lower portion of the frame along a second substantially horizontal axis, for permitting said second tree engaging means to be movable between a first position in contact with the tree trunk substantially below said horizontal axis and a second position in contact with the tree trunk substantially at the same level as said horizontal axis, said second tree engaging means extending a substantial distance from said horizontal axis whereby pivoting of said platform and said tree engaging means from said first position to said second position causes said frame to be forced outwardly from the tree trunk, thereby tightening the fastening means and causing the tree stand to be more tightly secured to said tree trunk, said second substantially horizontal axis being closer to said inner end than to said outer end of said platform means; and
   stop means operatively attached to said platform preventing said platform from pivoting downwardly beyond a substantially horizontal position.

2. The tree stand of claim 1 wherein a seat is attached to a top portion of said frame.

3. The tree stand of claim 1 wherein said stop means comprises a cable operatively attached to a top portion of said frame and an outward portion of said platform.

4. The tree stand of claim 1 wherein said fastening means comprises a strap extending around said frame and around said tree trunk.

5. The tree stand of claim 1 wherein said first tree trunk engaging means comprises a pair of spaced apart projections for abutment with a tree trunk.

6. The tree stand of claim 1 wherein said second tree trunk engaging means comprises a pair of spaced apart members.

7. The tree stand of claim 1 including means for permitting said tree stand to be folded for transporting it from place to place.

8. The tree stand of claim 1 wherein said first tree trunk engaging means comprises a pair of elongated members pivotally attached intermediate the ends thereof to a top portion of said frame; seat means attached to the end of said elongated members opposite a tree abutting portion of the elongated members and brace means movably attached to said tree abutting portion and to an intermediate part of the frame whereby the seat and first tree abutting portion is selectively secured in a substantially horizontal position for use or, when said brace means is disconnected from said elongated members, said seat and said elongated members can be folded compactly for transportation from place to place.

9. A tree stand comprising:
 a frame adapted to be substantially vertically disposed along a tree trunk;
 a first tree trunk engaging means attached to a top portion of said frame for engaging a tree trunk at a first vertical level, said first tree trunk engaging means comprising a pair of elongated members pivotally attached intermediate the ends thereof to a top portion of said frame;
 a second tree engaging means for engaging said tree trunk at a second vertical level;
 fastening means extending around a tree trunk for attaching an upper portion of said frame to the tree trunk;
 platform means rigidly attached to said second tree engaging means for permitting a person to stand on said platform when it is disposed in a horizontal disposition;
 pivot means for pivotally attaching said second tree engaging means and thereby said platform means to a lower portion of the frame along a substantially horizontal axis, for permitting said second tree engaging means to be movable between a first position in contact with the tree trunk substantially below said horizontal axis and a second position in contact with the tree trunk substantially at the same level as said horizontal axis, said second tree engaging means extending a substantial distance from said horizontal axis whereby pivoting of said platform and said tree engaging means from said first position to said second position causes said frame to be forced outwardly from the tree trunk, thereby tightening the fastening means and causing the tree stand to be more tightly secured to said tree trunk;
 stop means operatively attached to said platform preventing said platform from pivoting downwardly beyond a substantially horizontal position;
 seat means attached to the end of said elongated members opposite a tree abutting portion of the elongated members; and
 brace means removably attached to said tree abutting portion and to an intermediate part of the frame whereby the seat and first tree abutting portion is selectively secured in a substantially horizontal position for use or, when said brace means is disconnected from said elongated members, said seat and said elongated members can be folded compactly for transportation from place to place.

* * * * *